UNITED STATES PATENT OFFICE.

WALTER ALEXANDER, OF NEW YORK, N. Y.

PAINT-REMOVER COMPOSITION.

1,143,877.

Specification of Letters Patent.   Patented June 22, 1915.

No Drawing.   Application filed February 23, 1910. Serial No. 545,264.

*To all whom it may concern:*

Be it known that I, WALTER ALEXANDER, a citizen of the United States of America, and a resident of the city of New York, borough of Manhattan, State of New York, have invented a certain new and useful Paint-Remover Composition, of which the following is a specification.

I have discovered that solutions of cellulose esters in organic solvents can be modified by the addition of very small quantities of certain substances in so far that they constitute a composition remaining in fluid condition many hours longer than without such additions. If, for example, a solution of cellulose esters in acetone, such as pyroxylin varnishes, be spread on a surface, the organic solvent of the solution evaporates very quickly and permits the cellulose ester to dry to a hard skin. But if this same varnish be treated with a fractional percentage of certain solid hydrocarbons, or of waxy bodies, for example, either paraffin or beeswax or stearic acid, or the like, dissolved in an organic solvent, then the solvents, even the most volatile, such as acetone, do not evaporate quickly, but the composition remains fluid for many hours, and even after about twenty to twenty-four hours the solvents are still retained to such an extent that the hard drying of the composition is prevented.

My composition possesses the property that it will form an emulsion with water, or with a solution of a carbohydrate, such as glucose, and the like, in water. Such compositions find various applications in the arts. They may be employed as most efficient paint, varnish and lac removers, for the reason that the skin or coating covering the composition is substantially impenetrable to the volatile solvents and retains them in contact with the surfaces to be treated for so long a period that the removal of the paint is accomplished most thoroughly. The prevention of the rapid evaporation also enables the operator to work slowly in the application of the remover and the cleaning of the treated surface. Furthermore, my composition in the aqueous form described has the double capacity as a paint remover of equal efficiency either to attack oil or water paints or both, where one superposes the other.

If instead of water, an aqueous solution of an acid, such as oxalic, be added to the composition, the liquid thus obtained may be employed as a cleaning fluid for hard wood floors, and like surfaces; and if the substance dissolved in water possesses bleaching properties, as for example, sulfurous acid, the liquid obtained by such addition may be applied as a bleaching agent for hard wood floors, and similar surfaces.

In practising my invention, I prefer to proceed as follows: Two parts of glucose are dissolved in two parts of water; to this solution fifty-seven parts of a pyroxylin varnish are added; then ten parts of acetone and seventeen parts of coal-tar benzol; then ten parts of water are stirred into the liquid; and finally one-tenth part of paraffin dissolved in five parts of benzol are added.

In the above formula the glucose solution may be substituted by plain water to which a nitrocellulose solution or acetylcellulose solution is directly added.

Although I have above described an example by which the object of my invention may be accomplished, I do not wish to be understood as excluding from my claims equivalents for the ingredients or for the operations employed in the process, as equivalent substitutes may be employed and steps taken without departing from the scope or purpose of the process intended to be secured hereby.

I claim:

1. A fluid composition of matter comprising a solution of a cellulose ester in a volatile organic solvent, said solution having film-forming properties and consistency, a small amount of a waxy body in solution and an aqueous liquid, said composition possessing the property of forming a cellulose ester film upon exposure to the air, but remaining fluid beneath said film for many hours, and being a paint remover for both water and oil paints.

2. A fluid composition of matter comprising a solution of a nitrocellulose in a volatile organic solvent, said solution having film-forming properties and consistency, a small amount of a waxy body in solution and an aqueous liquid, said composition possessing the property of forming a nitrocellulose film upon exposure to the air, but remaining fluid beneath said film for many hours, and being a paint remover for both water and oil paints.

3. A fluid composition of matter comprising a solution of a cellulose ester in a volatile organic solvent, said solution being of film-forming consistency and properties, a fraction of a per cent. of a waxy body in solution, and an aqueous liquid, said composition possessing the property of forming a cellulose ester film upon exposure to the air, but remaining fluid beneath said film for many hours, and being a paint remover for both water and oil paints.

4. A fluid composition of matter comprising the following ingredients in about the following proportions,—2 parts glucose dissolved in 2 parts water, 57 parts of pyroxylin varnish, 10 parts of acetone, 17 parts of coal tar benzene, 10 parts of water and 1/10 part of paraffin dissolved in benzol.

5. As a new composition of matter a cellulose-ester solution which is kept in a fluid condition, when exposed to evaporation under the conditions as herein described, comprising cellulose esters dissolved in organic solvents, an aqueous solution of a carbohydrate and a waxy body, substantially as described.

6. As a new composition of matter a cellulose-ester solution which is kept in a fluid condition, when exposed to evaporation under the conditions as herein described, comprising cellulose esters dissolved in organic solvents, an aqueous solution of a carbohydrate and paraffin, substantially as described.

7. As a new composition of matter a cellulose-ester solution which is kept in a fluid condition, when exposed to evaporation under the conditions as herein described, comprising pyroxylin dissolved in organic solvents, an aqueous solution of a carbohydrate and a waxy body, substantially as described.

8. As a new composition of matter a cellulose-ester solution which is kept in a fluid condition, when exposed to evaporation under the conditions as herein described, comprising pyroxylin dissolved in organic solvents, an aqueous solution of a carbohydrate and paraffin, substantially as described.

9. As a new composition of matter a cellulose-ester solution which is kept in a fluid condition, when exposed to evaporation under the conditions as herein described, comprising cellulose esters dissolved in organic solvents, an aqueous solution of glucose and a waxy body, substantially as described.

10. As a new composition of matter a cellulose-ester solution which is kept in a fluid condition, when exposed to evaporation under the conditions as herein described, comprising cellulose esters dissolved in organic solvents, an aqueous solution of glucose and paraffin, substantially as described.

11. As a new composition of matter a cellulose-ester solution which is kept in a fluid condition, when exposed to evaporation under the conditions as herein described, comprising pyroxylin dissolved in organic solvents, an aqueous solution of glucose and a waxy body, substantially as described.

12. As a new composition of matter a cellulose-ester solution which is kept in a fluid condition, when exposed to evaporation under the conditions as herein described, comprising pyroxylin dissolved in organic solvents, an aqueous solution of glucose and paraffin, substantially as described.

13. A composition of matter comprising a solution of nitrocellulose in an organic solvent emulsified with a liquid comprising water, and containing less than one per cent. of a waxy body.

14. A composition of matter comprising a solution of nitrocellulose in acetone emulsified with a liquid comprising water, and containing less than one per cent. of a waxy body.

In testimony whereof I have hereunto set my hand in the presence of two subscribing witnesses.

WALTER ALEXANDER.

Witnesses:
ELIZABETH J. VAIL,
SEWARD DAVIS.